United States Patent Office 3,342,083
Patented Sept. 19, 1967

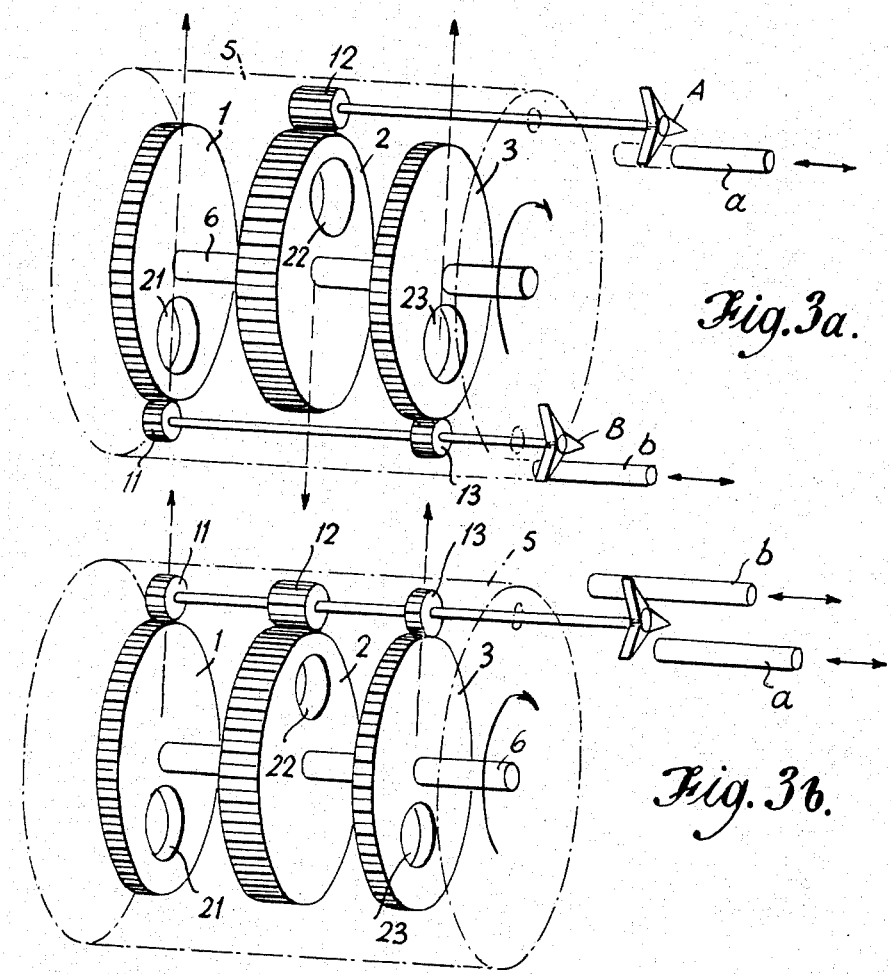
*Fig. 3a.*
*Fig. 3b.*
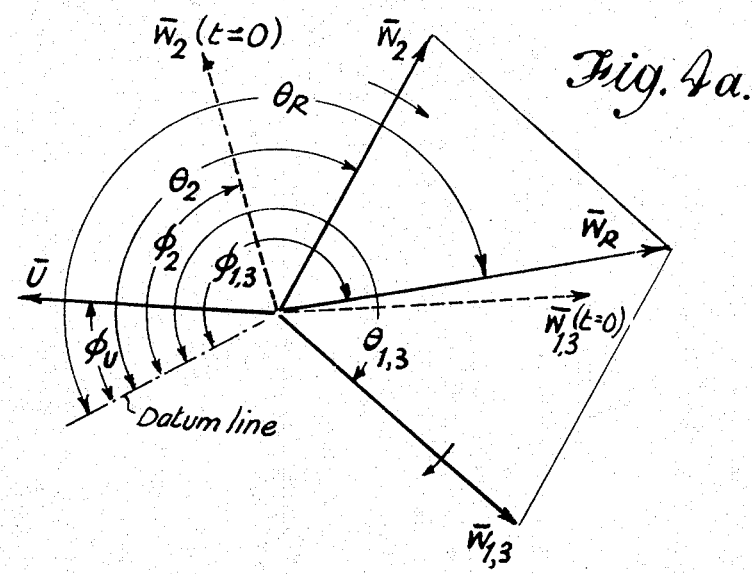
*Fig. 4a.*

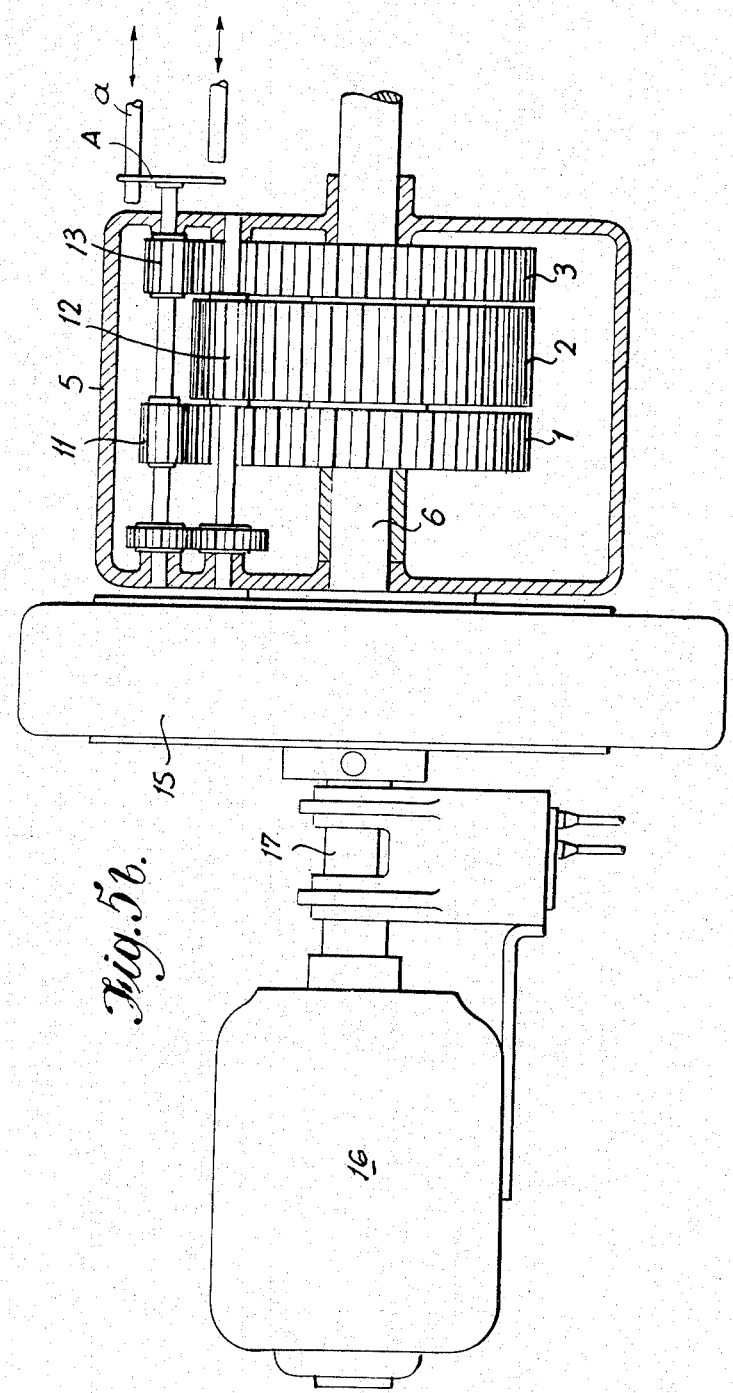

3,342,083
CORRECTION BALANCING OF ROTATING BODIES
Henryk Kaliszer, Edgbaston, Birmingham, and Stephen Vipan Hayes, Kings Heath, Birmingham, England, assignors to National Research Development Corporation, London, England, a corporation of Great Britain
Filed Sept. 13, 1965, Ser. No. 486,695
Claims priority, application Great Britain, Sept. 16, 1964, 37,917/64
13 Claims. (Cl. 74—573)

This invention relates to the balancing of a rotating body such as, for example, a grinding wheel.

In many instances of balancing rotating bodies, it is desirable to carry out the balancing operation when the rotating body is mounted in its own machine and running under normal operating conditions. It is an object of the present invention to provide a device for balancing rotating bodies which fulfils this condition, and which is very simple in construction and operation.

Figure 1A:
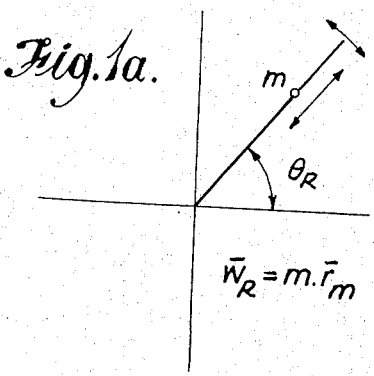
Figure 1B:
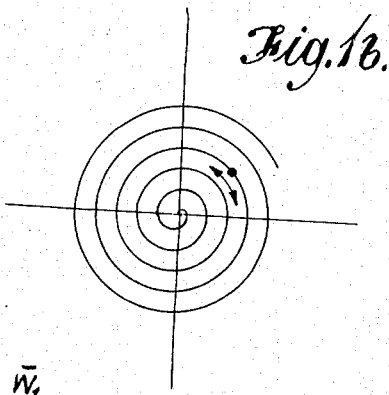
Figure 2A:
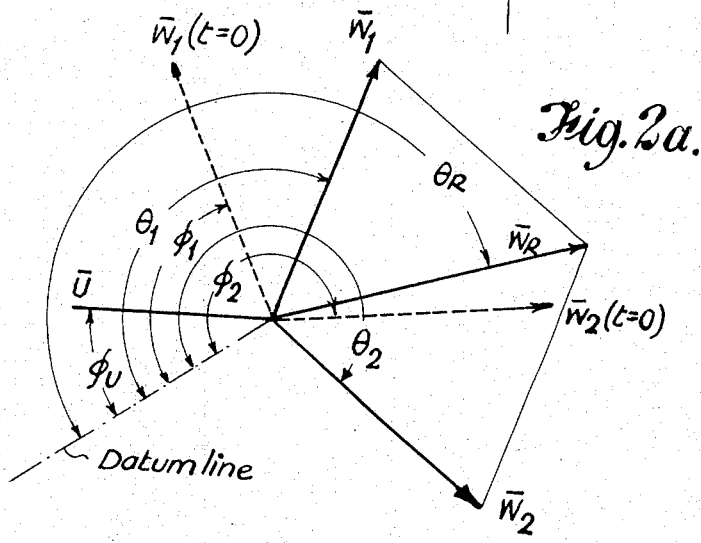
Figure 2B:
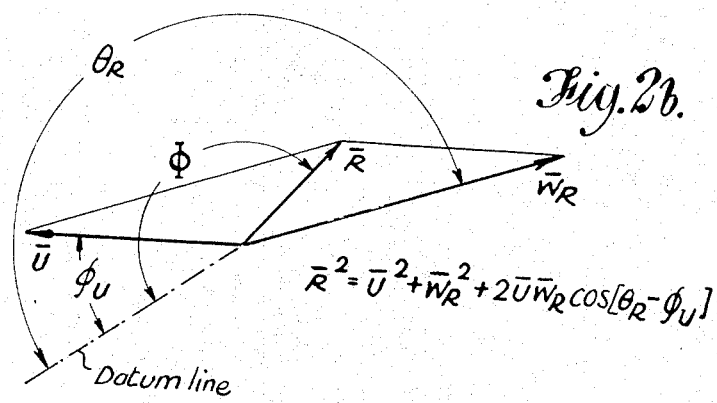
Figure 4B:
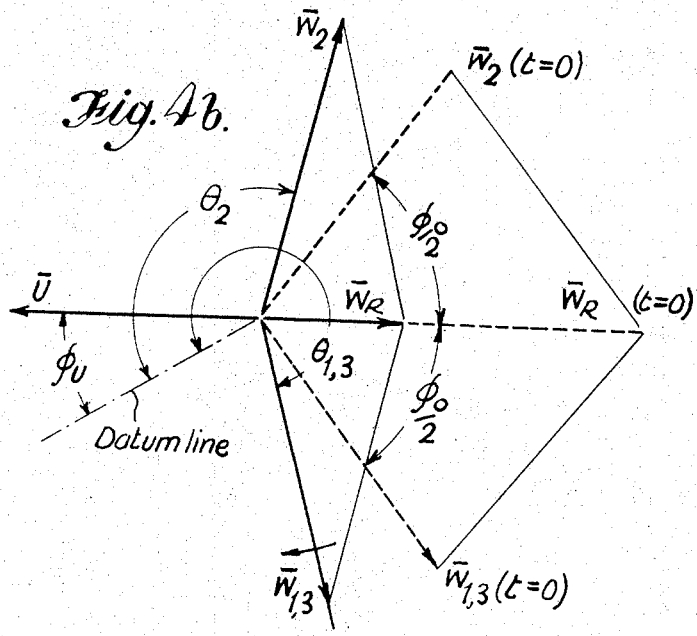

Several particular embodiments of the invention will be described by way of example with reference to the accompanying drawings in which Figure 1(a) shows the locus of the resultant correction mass when balancing by the selected locus method, FIGURE 1(b) shows one possible locus (spiral) of the resultant correction mass when balancing by the fixed locus method, FIGURES 2(a) and 2(b) are vector diagrams in connection with the balancing of a rotating body, FIGURE 3(a) shows one particular embodiment of a balancing device according to the invention, the device being adapted for selected locus correction, FIGURE 3(b) shows one embodiment of a balancing device according to the invention, the device being adapted for fixed locus correction, the fixed locus being a spiral, FIGURES 4(a) and 4(b) are more vector diagrams in connection with the balancing of a rotating body.

Figure 5A:
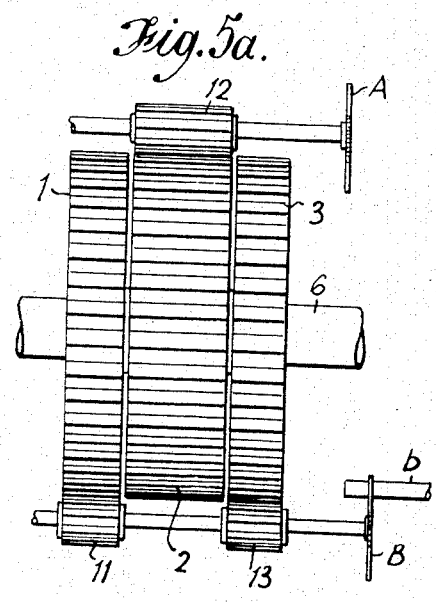
Figure 5C:
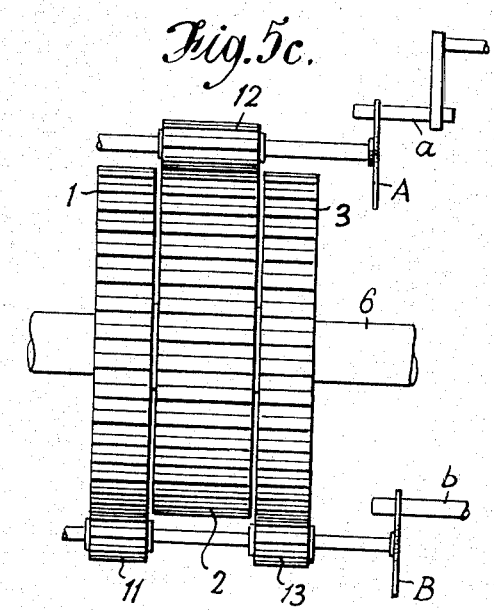

FIGURES 5(a), 5(b) and 5(c) show further particular embodiments of balancing devices according to the invention, all three devices being adapted for fixed locus correction, the locus of FIGURE 5(a) being a spiral, and the loci of FIGURES 5(b) and 5(c) being a radial loop.

Methods of applying correction

When correction is applied in the diametral plane containing the unbalance ($\overline{U}$, $\phi_u$) a state of balance is obtained by making the correction ($\overline{W}_R$) equal in magnitude to the unbalance ($\overline{U}$) and the angle of the resultant correction ($\theta_R$) equal to $\phi_u + \pi$. This is illustrated in FIGURE 2(a) and from 2(b) it will be clear that this required condition of balance exists when $\overline{R}$ the resultant of correction ($\overline{W}_R$) and unbalance ($\overline{U}$), is zero. This can best be detected by a suitable senser positioned on a rotor shaft bearing and giving a signal which is proportional to the resultant ($\overline{R}$). I.e., signal from senser $\propto f(C)$, where $C = \Omega^2 \overline{R}$ and $\Omega$ is the angular speed of rotation of the rotor, rads/sec.

Two methods are available for making the required change in the correction.

The selected locus method enables the correction angle ($\theta_R$) to be adjusted to $\phi_u + \pi$ with a constant magnitude ($\overline{W}_R$), the required position being detected as a minimum vibration at the senser (FIGURE 1(a)). With constant correction angle ($\theta = \phi_u + \pi$) the magnitude ($\overline{W}_R$) is increased or decreased until $\overline{W}_R = \overline{U}(\overline{R}=0)$ which is detected as a zero signal from the senser ($C=0$).

In the fixed locus method (FIGURE 1(b)), $\overline{W}$ and $\theta_R$ vary in a predetermined manner so that the resultant correction mass moves so that its centre of mass sweeps over a path which is either a spiral or a series of radial loops. Somewhere on this path the correction is close to that required for exact balance and the signal from the senser will be nearly zero. The accuracy of this method depends upon having a small change in magnitude of $\overline{W}$ after each spiral convolution.

The kinematic behaviour of the geared disc device, which employs either of these methods, is now considered.

Selected-locus method

The device is contained in a cylindrical case 5 attached to the rotor with its axis colinear with the axis of rotation as in FIGURE 3(a). A co-axial spindle 6 carries unbalanced gears 1, 2 and 3 each having N teeth and free to rotate when driven by starwheel-actuated pinions 11, 12 and 13, respectively. Each pinion has N teeth and the starwheels receive impulses from the fixed striker, as the casing 5 rotates. Gears 1 and 3 are driven by starwheel B, and gear 2 by starwheel A. When strikers $a$ and $b$ are in the position shown in the figure, striker $b$ operates both starwheels consecutively. Although the starwheels are in different diametral planes the striker $b$ is long enough to make each rotate through $\alpha$ radians anti-clockwise relative to the casing 5 for each revolution of the latter. Correction components $\overline{W}_1$, $\overline{W}_2$ and $\overline{W}_3$ are produced by holes 21, 22 and 23 in the gears 1, 2 and 3 respectively. The correction components can also be produced by cheek masses or by both holes and cheek masses. It is clear that dynamic couples can be avoided by making $$\overline{W}_1 = \overline{W}_3 = \frac{\overline{W}_2}{2}$$

and $$\phi_1 = \phi_3 = \phi_{1,3}$$

gears 1 and 3 being symmetrically arranged along the axis on either side of gear 2.

Referring to FIGURE 4(a):

Gears 1, 2, and 3 rotate through angle $i\alpha t\, n/N$ after time $t$, measured clockwise relative to the casing, where $i$ is the number of impulses per unit time, per starwheel; then $$\theta_2 = \phi_2 + i\alpha t\, n/N$$

and $$\theta_{1,3} = \phi_{1,3} + i\alpha t\, n/N$$

and $$\theta_R = \frac{\theta_2 + \theta_{1,3}}{2} = \frac{\phi_2 + \phi_{1,3}}{2} + i\alpha t \frac{n}{N}$$

also $$\overline{W}_R = 2.\overline{W}.\cos \phi_{0/2}$$

where $$\overline{W} = \overline{W}_2 = \overline{W}_{1,3}$$

and $$\phi_0 = \phi_{1,3} - \phi_2$$

giving $$\omega_R = \frac{d\theta_R}{dt} = i\alpha \frac{n}{N} \qquad (1)$$

and $$\frac{d\overline{W}_R}{dt} = 0 \qquad (2)$$

Thus the magnitude of correction remains constant whilst the angular position of the vector (phase angle) changes. If the striker $b$ is moved towards the casing so that only starwheel B is actuated by $b$ in the same sense as before, and striker $a$ is moved into engagement with starwheel A so as to cause an opposite rotation, then the correction $\overline{W}_2$ rotates anti-clockwise and $\overline{W}_{1,3}$ continues clockwise. Normally this change would be made when the resultant correction is at a fixed angle, $\theta_R = \phi_u + \pi$ and the included angle will be $\phi_0$ when the strikers are moved from their original position ($t=0$). Then at time $t$ after the strikers were moved $$\theta_{1,3}=\phi_\mathrm{U}+\pi+\frac{\phi_0}{2}+i\alpha t\frac{n}{N}$$

and $$\theta_2=\phi_\mathrm{u}+\pi-\frac{\phi_0}{2}-i\alpha t\frac{n}{N}$$

$$\theta_\mathrm{R}=\frac{\theta_{1,3}+\theta_2}{2}=\phi_\mathrm{u}+\pi$$

also $$\overline{W}_\mathrm{R}=2.\overline{W}\cos\left(\frac{\phi_0}{2}+i\alpha t\frac{n}{N}\right)$$

giving $$\omega_\mathrm{R}=\frac{d\theta_\mathrm{R}}{dt}=0 \qquad (3)$$

i.e. the angle of the resultant does not change.
The rate of change of magnitude of the resultant correction $$=\frac{d.\overline{W}_\mathrm{R}}{dt}=-2\overline{W}.i\alpha\frac{n}{N}\cdot\sin\left(\frac{\phi_0}{2}+i\alpha t\frac{n}{N}\right) \qquad (4)$$

This system has the advantage of being completely dynamically self-balanced, and is very simple in design.

Fixed locus method

This system is shown diagrammatically in FIGURE 3(b). Here the gears 1, 2, 3 are all actuated by the same drive shaft 7 and starwheel but gear 2 has $N+1$ teeth and gears 1 and 3 have N teeth, so that the middle gear rotates more slowly than the outer gears. The resultant correction thus changes slowly as $\theta_\mathrm{R}$ changes i.e. the locus of the centre of gravity of the correction mass is a tight spiral. Striker *a* produces clockwise relative rotation and striker *b* produces anti-clockwise rotation of the resultant mass. Referring to FIGURE 4(a):

$$\theta_{1,3}=\phi_{1,3}$$

and $$\theta_2=\phi_2$$

when $$t=0$$

then $$\theta_{1,3}=i\alpha t.\,n/N+\phi_{1,3}$$

and $$\theta_2=i\alpha t\frac{n}{N+1}+\phi_2$$

$$\therefore \theta_\mathrm{R}=\frac{\theta_{1,3}+\theta_2}{2}=\frac{i\alpha tn(2N+1)}{2N(N+1)}+\frac{\phi_{1,3}+\phi_2}{2}$$

and $$\omega_\mathrm{R}=\frac{d\theta_\mathrm{R}}{dt}=\frac{i\alpha n(2N+1)}{2N(N+1)} \qquad (5)$$

also $$\overline{W}_\mathrm{R}=2\overline{W}\cos\left(\frac{\theta_{1,3}-\theta_2}{2}\right)$$

$$=2\overline{W}\cos\left(\frac{i\alpha tn}{2N(N+1)}+\frac{\phi_{1,3}-\phi_2}{2}\right) \qquad (6)$$

or for the particular case of $\phi_{1,3}=\phi_2$ when $t=0$.

$$\overline{W}_\mathrm{R}=2\overline{W}\cos\frac{i\alpha tn}{2N(N+1)} \qquad (7)$$

If total time for the correction $\overline{W}_\mathrm{R}$ to increase from zero to maximum$=T$ minutes then $$\frac{\pi}{2}=\frac{i\alpha T.n}{2N(N+1)}$$

and $$T=\frac{\pi.N(N+1)}{i\alpha n.}\text{ minutes}$$

If the total time for one convolution of the correction $\overline{W}_\mathrm{R}$ on the spiral path is $T_\mathrm{c}$ minutes
then $$2\pi=\frac{i\alpha T_\mathrm{c}n(2N+1)}{2N(N+1)}$$

$$\therefore T_\mathrm{c}=\frac{4\pi N(N+1)}{i\alpha n(2N+1)}$$

The total number of convolutions $$=\frac{T}{T_\mathrm{c}}=\frac{\pi.N(N+1)}{i\alpha n}\times\frac{i\alpha n(2N+1)}{4\pi N(N+1)}$$

$$=\frac{2N+1}{4} \qquad (8)$$

from zero to maximum.

This type of balancer has a non-uniform spiral path. Thus the rate of change of the magnitude of the correction resultant is rapid at the middle of the correction range but slow at the extremes of the range.

By introducing a reversing gear 8 between the central pinion 12 and the central gear 2 as shown in FIGURE 5(b), the spiral locus may be changed to tight radial loops. The radius then changes quite rapidly and the phase angle slowly. A fan-shaped area may be scanned without the necessity for exploring a circular area.

Of course several combinations of the devices described above can be made to give the desired locus (either spiral or radial loop) with the fixed locus balancer. For example the balancer shown in FIGURE 5(a) combines the starwheel and striker arrangement of FIGURE 3(a) using a single striker with the unequal number of teeth of the out of balance gear wheels as shown in FIGURE 3(b). This results in a fixed locus balancer having a spiral locus which may be operated as a selected locus type when required. The theory and the operation of the balancer of FIGURE 5(a) is so similar to those of the balancers already discussed that no further discussion is necessary here.

Similarly the balancer shown in FIGURE 5(c) combines the starwheel and striker arrangement of FIGURE 3(a) using two strikers with the unequal number of teeth of the out of balance gear wheels as shown in FIGURE 3(b).

FIGURE 5(a) shows the balancer mounted on a rotating body 15 in order to balance the body 15 during rotation. The body 15 is driven by a motor 16 via a shaft 17. A sensor 18 is mounted on the shaft 17 and is adapted to sense vibration as the body 15 rotates so as to give an indication of the state of unbalance of the body and the balancing device together when the unbalance is at a minimum (i.e. when the balancer has compensated for the unbalance of the body), the vibration will also be at a minimum.

In the detailed descriptions above, the correction mass has been provided by gear wheels with eccentric holes drilled in the gear wheels to put them out of balance. Of course it will be understood that this out of balance could equally well be provided by cheek masses mounted on the gear wheels, or by both drill holes and cheek masses together.

Likewise, in the detailed descriptions above, the source of power to drive the out of balance gear wheels has been derived from the rotation of the balancing device mounted on the body being balanced, the power being obtained through the use of starwheels and starikers as shown. Several alternative sources of power could be used. The power supply can be external, for example an air turbine connected to the out of balance gear wheels and driven by a source of compressed air. The power supply can also be internal, for example an electric motor mounted inside the housing of the balancer and connected to the out of balance gear wheels, the electric motor being actuated through slip rings by an external electric power supply.

The above embodiments have been described merely by way of example and the invention is not meant to be limited only to those described. Various modifications will be obvious to those skilled in the art.

We claim:

1. Apparatus for balancing a rotating body comprising a frame adapted to be mounted on the rotating body for rotation with the body, a plurality of balancing masses mounted on the frame, each mass having its centre of mass offset from the axis of rotation of the frame with the body, and being adapted to rotate relative to the frame but constrained so that the centre of mass can only travel in a circular path about the axis of rotation of the frame, and means to rotate each mass relative to the frame.

2. Apparatus according to claim 2 in which each mass comprises a gear, and the means to rotate the mass includes a pinion acting directly on the gear.

3. Apparatus according to claim 2 in which the masses are divided into two groups.

4. Apparatus according to claim 3 in which the two groups are adapted to rotate in the same sense.

5. Apparatus according to claim 4 in which the two groups are also adapted to rotate in opposite senses.

6. Apparatus according to claim 4 in which one group is adapted to rotate at a speed different from the speed of the other group.

7. Apparatus according to claim 5 in which two groups are adapted to rotate at the same speed, both in the same sense and in opposite senses.

8. Apparatus according to claim 3 in which one group comprises a single gear and the other group comprises two gears one mounted axially on either side of the single gear in such a way as to minimize couple unbalance.

9. Apparatus according to claim 2 in which the offset centre of mass is achieved by providing an offset hole in each gear.

10. Apparatus according to claim 2 in which to offset centre of mass is achieved by providing an offset cheek mass on each gear.

11. Apparatus according to claim 2 in which each pinion is carried on a shaft which is mounted on the frame, the shaft being rotatable extraneously relative to the frame whereby to rotate the gear relative to the frame.

12. Apparatus according to claim 11 in which a star wheel is mounted on the shaft, the starwheel being engageable extraneously to rotate the shaft relative to the frame.

13. Apparatus according to claim 12 in which a striker is provided which is mounted separate from the frame and is positioned so that it engages with the starwheel once during each rotation of the frame, thereby rotating the shaft relative to the frame.

References Cited

UNITED STATES PATENTS

| | | | |
|---|---|---|---|
| 1,678,887 | 7/1928 | Trumpler | 74—573 X |
| 1,730,019 | 10/1929 | Trumpler | 74—573 |
| 2,091,080 | 8/1937 | Mursch | 74—573 X |
| 2,241,637 | 5/1941 | Ernst et al. | 74—573 |
| 3,158,038 | 11/1964 | Goodman | 74—573 |
| 3,177,738 | 4/1965 | Achilles | 74—573 |
| 3,277,741 | 10/1966 | Kaliszer et al. | 74—573 |

FRED C. MATTERN, Jr., *Primary Examiner.*

W. S. RATLIFF, *Examiner.*